A. R. LUMSDEN.
EXPANSION PISTON PIN.
APPLICATION FILED AUG. 22, 1921.
1,435,406.  Patented Nov. 14, 1922.
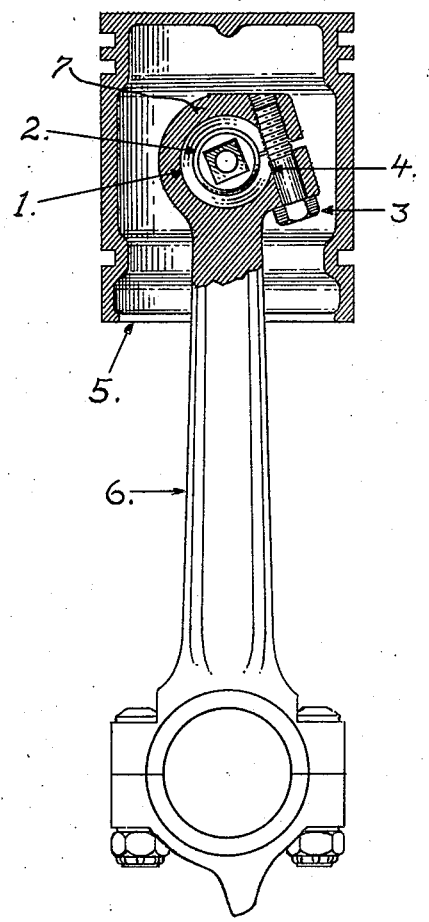
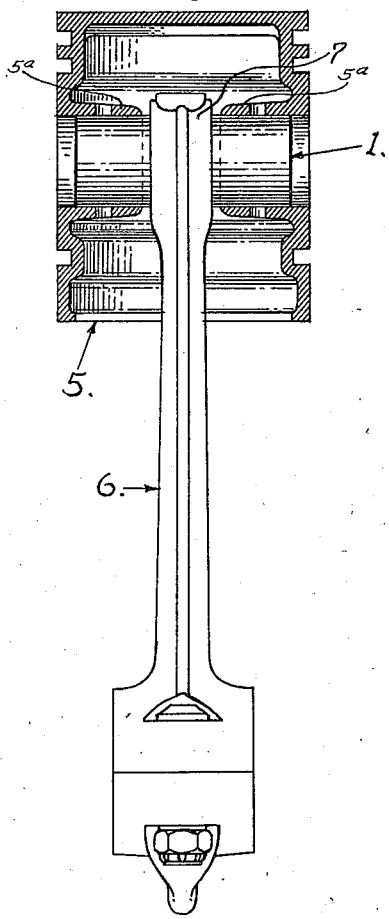
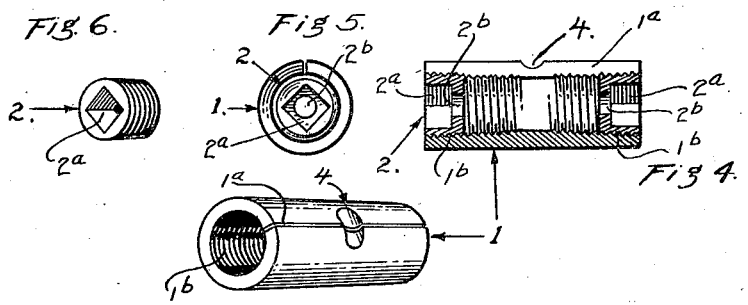

Patented Nov. 14, 1922.

1,435,406

UNITED STATES PATENT OFFICE.

ALLEN R. LUMSDEN, OF MOUNT ZION, ILLINOIS.

EXPANSION PISTON PIN.

Application filed August 22, 1921. Serial No. 494,108.

*To all whom it may concern:*

Be it known that I, ALLEN R. LUMSDEN, a citizen of the United States, a resident of Mount Zion, in the county of Macon and State of Illinois, have invented new and useful Improvements in Expansion Piston Pins, of which the following is a specification.

This invention has reference to an improved piston-pin for coupling the piston rod to the piston, preferably for internal combustion engines.

The invention has for its principal object a construction which allows for an expansion of the pin at either end, separately and independently, for the purpose of taking up wear in the journal bearing between the ends of the pin and the piston.

The invention has for a further object to provide a hollow longitudinally split pin, and in the provision of expanding means for each end of the pin, including also means for securing the pin against oscillation in the end of the piston-rod.

The split portion of the pin being preferably off-set to one side of a line drawn vertically through the axis of the pin; whereby scraping action of the edges of the split portion of the pin on the bearing sleeves of the piston is avoided, due to the upward and downward travel of the piston.

A further object of the invention is to provide in a device of the character referred to a hollow pin through which lubricating oil may be inducted for the purpose of lubrication.

Further objects, such as it being possible to install the device in stock motors already in use, and in the provision of a light substantial device, which is inexpensive, will appear from the following description.

That the invention may be more fully understood, reference is had to the accompanying drawings forming a part of the present description, illustrating a preferred embodiment of the invention, in which:—

Fig. 1 is a cross-section illustrating a piston and piston-rod connection, wherein my improved expansion piston pin is employed;

Fig. 2 is a view similar to Fig. 1 except the section is at right angles thereto;

Fig. 3 is a perspective view of hollow split pin;

Fig. 4 is a longitudinal sectional view through the pin, showing the expanding nuts or plugs in place therein;

Fig. 5 is an end view, as the same would appear looking in at the left hand end of Fig. 4, and Fig. 6 is a perspective view of one of the expanding nuts or plugs.

Like characters of reference denote corresponding parts throughout the figures.

The piston 5 and the piston-rod 6 are of the usual construction and not unlike many in use and need no further detailed description, except to mention the axially arranged inwardly projecting bearing sleeves or bosses $5^a$ in the piston in which the pin has a bearing.

1 designates my improved pin which is tubular in cross-section, as shown, and split longitudinally for its entire length, as at $1^a$, and the interior of the pin is oppositely threaded, at its opposite ends, as at $1^b$ and preferably tapered from the ends of the pin to the inner terminals thereof. 2 designates threaded expanding nuts or plugs adapted to be screwed into the opposite ends of the pin; said nuts or plugs having tool sockets $2^a$ for the reception of a suitable tool to screw up or unscrew said nut or plugs and an opening $2^b$ in said nuts or plugs which is a continuation of said socket but may be smaller in cross-section, provide a continuous opening longitudinally through the pin which holds up the oil vacuum around the pin for purposes of lubrication.

The pin is provided exteriorly, preferably midway of its length and on either side of and adjacent its split edges with a seat 4 to receive the locking screw 3 which is screwed into the bifurcated or split tubular head or yoke 7 of the piston rod which is clamped about the pin 1 between the inner ends of the bearing sleeves $5^a$, as shown in Figs. 1 and 2.

When assembling the parts the split portion of the pin is off-set to one side of a line drawn vertically through the axis of said pin which will locate the seat 4 in a position to receive the locking screw employed to clamp the piston-rod on the pin, see Fig. 1.

Thus, when the expanding nuts or plugs are screwed inwardly, the expansion of the ends of the pin in the bearings of the piston is at the top and lower sides of the pin where the wear is the greatest, due to the upward and downward travel of the piston. The advantage of the separate and independent expanding nuts or plugs is seen when it is understood that the wear of the pin is not always at both ends, sometimes more at one side than at the other end.

Attention is further called to the fact that when the head or yoke 7 of the piston rod is clamped about the piston pin, the locking screw 3 is screwed up sufficiently tight to clamp the expanding nuts or plugs within the piston pin.

I am aware that an effort has been made to accomplish the result herein attained, but it has been by a rather cumbersome and complicated device, and where both ends must necessarily be expanded at the same time. Not only is it desirable to provide for the separate and independent expansion of the ends of the pin, but the structure must be of few parts and light so as not to throw the motor out of balance by excessive weight. Such a device is exhibited in my improvement, and it is also one which may be placed in stock motors already in use.

What I claim is:—

1. In a device of the character described, a tubular pin split longitudinally throughout its length and threaded interiorly at its opposite ends and in opposite directions, and threaded plugs adapted to have a screw engagement with the threads in said pin, said plugs having openings axially therethrough to provide an uninterrupted duct through the pin for the induction of a lubricating medium, said openings being of such contour as will receive an adjusting tool.

2. In a device of the character described, in combination, a piston having axially aligned bearing sleeves, a tubular pin fitting said bearings split longitudinally throughout its length and provided interiorly with oppositely threaded ends, an expanding nut for each end of said pin, whereby the opposite ends of the pin may be expanded separately, said nuts having openings axially therethrough to provide an uninterrupted duct through the pin for the induction of a lubricating medium, a piston rod, means to clamp the rod on the pin with the split portion of the latter off-set to one side of a line drawn axially through the axis of the pin, such clamping action also clamping the expanding nuts within the pin, and means to lock the pin against rotation in the clamp of the piston rod.

In witness whereof, I have hereunto affixed my hand this 11 day of August, 1921.

ALLEN R. LUMSDEN.